United States Patent
Zuziak et al.

(10) Patent No.: US 7,859,390 B2
(45) Date of Patent: Dec. 28, 2010

(54) SYSTEM FOR MEASURING A DISTANCE BETWEEN TWO POINTS AND METHOD UTILIZING THIS SYSTEM

(76) Inventors: Zbigniew Zuziak, 4510 Grove Ave., Apt. 4, Brookfield, IL (US) 60513; Bozena Lasota, 4510 Grove Ave., Apt. 4, Brookfield, IL (US) 60513

( * ) Notice: Subject to any disclaimer, the term of this patent is extended or adjusted under 35 U.S.C. 154(b) by 1071 days.

(21) Appl. No.: 11/603,418

(22) Filed: Nov. 22, 2006

(65) Prior Publication Data

US 2007/0120672 A1  May 31, 2007

Related U.S. Application Data

(60) Provisional application No. 60/739,548, filed on Nov. 23, 2005.

(51) Int. Cl.
*B60Q 1/00* (2006.01)

(52) U.S. Cl. .............. 340/435; 340/539.21; 340/572.1; 340/686.6; 342/70

(58) Field of Classification Search ................. 340/435, 340/436, 539.1, 539.21, 539.13, 539.15, 340/539.11, 572.1, 686.6, 903; 342/70, 71, 342/72, 42, 125, 145
See application file for complete search history.

(56) References Cited

U.S. PATENT DOCUMENTS

| 4,961,575 | A | * | 10/1990 | Perry | 273/460 |
| 6,614,387 | B1 | * | 9/2003 | Deadman | 342/70 |
| 7,375,627 | B2 | * | 5/2008 | Johnson et al. | 340/468 |
| 2006/0176178 | A1 | * | 8/2006 | Everest et al. | 340/572.1 |

* cited by examiner

*Primary Examiner*—Anh V La
(74) *Attorney, Agent, or Firm*—Factor & Lake, Ltd.

(57) ABSTRACT

A distance measuring system and method is disclosed having a transponder and an interrogation unit in communication with each other wherein, based upon a calculated distance between the transponder and the interrogation unit, a warning signal is provided if the calculated distance is within a predetermined range.

16 Claims, 5 Drawing Sheets

SYSTEM FOR MEASURING A DISTANCE BETWEEN TWO POINTS AND METHOD UTILIZING THIS SYSTEM

CROSS-REFERENCE TO RELATED APPLICATIONS

This application claims the benefit of U.S. Provisional Application No. 60/739,548 filed Nov. 23, 2005, incorporated herein by reference.

TECHNICAL FIELD

The present invention is directed to a distance measuring system. More specifically, the present invention is directed towards a system and method for measuring a distance between two points and providing an indication if the distance is within a predetermined distance for collision avoidance.

BACKGROUND OF THE INVENTION

There is a big collision threat in companies using forklifts, especially around traffic strip doors or flexible swing doors. These kinds of doors are opened directly in response to an approaching forklift, and close automatically. When too many forklifts are operated at the same time, there is a threat especially when two of the forklifts are going towards the same door coming from different directions. However, in numerous companies, traffic through the same door by both people and moving forklifts in necessary, and the collision threat in this situation is substantial.

Thus, to alleviate collision threat, there is a need for a measuring system and method to measure a distance between two points and providing an indication if the distance is within a predetermined distance.

SUMMARY OF THE INVENTION

A distance measuring apparatus and method is disclosed herein. In an embodiment in accordance with the present invention, a collision avoidance apparatus and method is disclosed.

In another embodiment in accordance with the present invention, the distance between two points is determined and a warning signal is provided if the calculated distance is within a predetermined range.

Other embodiments, systems, methods, features, and advantages of the present invention will be, or will become, apparent to one having ordinary skill in the art upon examination of the following drawings and detailed description. It is intended that all such additional systems, methods, features, and advantages included within this description be within the scope of the present invention, and can be protected by the accompanying claims.

BRIEF DESCRIPTION OF THE DRAWINGS

The invention may be better understood with reference to the following drawings. The components in the drawings are not necessarily to scale, emphasis instead being placed upon illustrating the principles of the invention. In the drawings, like reference numbers designate corresponding parts throughout.

DETAILED DESCRIPTION

The following descriptions of detailed embodiments are for exemplifying the principles and advantages of the inventions claimed herein. They are not to be taken in any way as limitations on the scope of the inventions.

In one application of an embodiment in accordance with the present invention, an electromagnetic wave transmitter is in communication with an electromagnetic wave receiver and an acoustic wave transmitter in communication with an acoustic wave receiver to provide distance calculating wherein, based upon a calculated distance between them, a warning signal is provided if the calculated distance is within a predetermined range.

Figure 1:
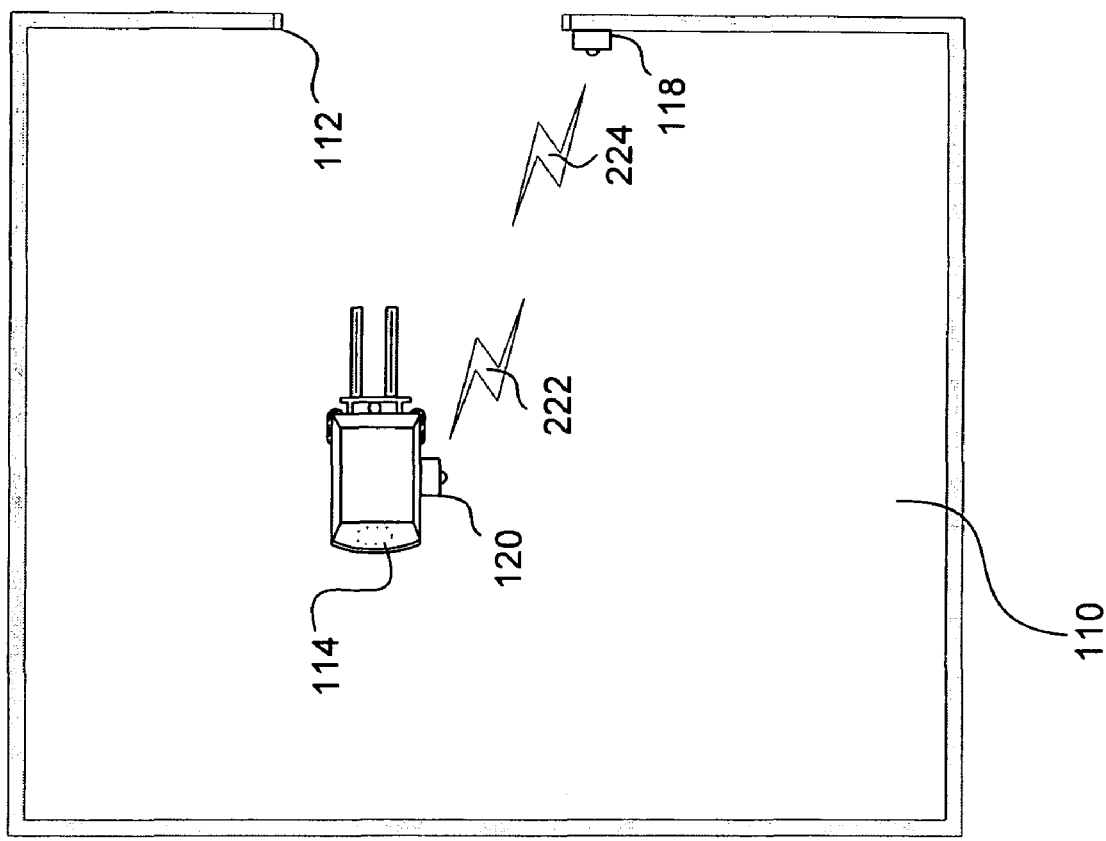
FIG. 1 is a simplified plan view of a floor within a warehouse wherein a system in accordance with the present invention is installed therein.

Turning to FIG. 1, a simplified plan view is provided of a floor within a warehouse having a system in accordance with the present invention installed therein. On the warehouse floor 110 is a door opening 112 and a forklift 114. Mounted to the forklift is a transponder in accordance with FIG. 3. Likewise, mounted about the door opening 112 is an interrogation unit in accordance with FIG. 2.

Figure 2:
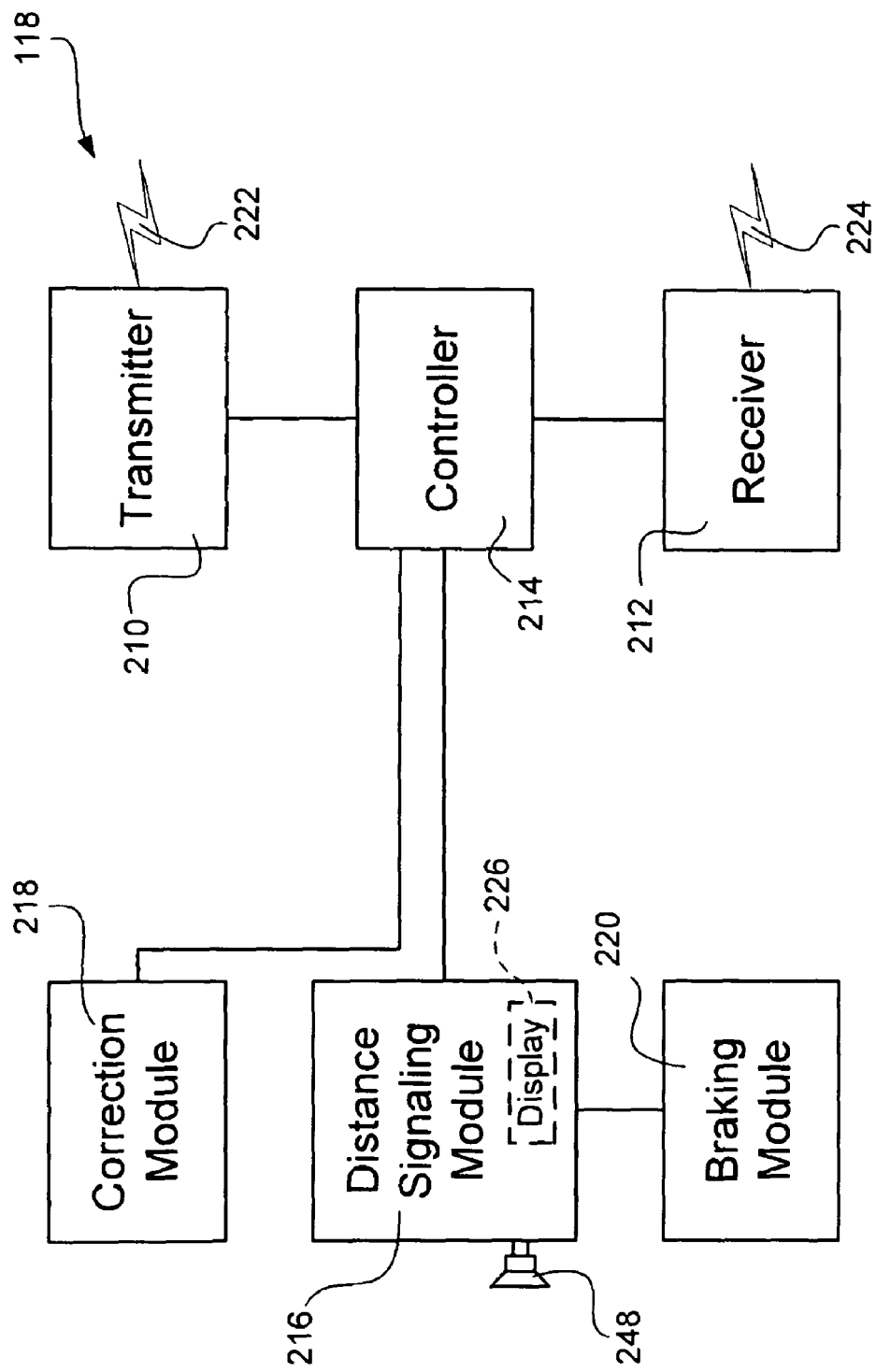
FIG. 2 is a block diagram illustrating the components of an interrogation unit in accordance to one embodiment of the present invention.

Turning to FIG. 2, the interrogation unit 118 includes an electromagnetic wave transmitter 210, an acoustic wave receiver 212, a controller 214, a distance signaling module 216, a correction module 218, and an optional braking module 220. The electromagnetic wave transmitter 210 can be a conventional electromagnetic wave transmitter having an electromagnetic wave output 222. Likewise, the acoustic wave receiver 212 can be a conventional acoustic wave receiver for receiving an acoustic wave input 224 from the acoustic wave transmitter 314 (FIG. 3).

The controller 214 of the interrogation unit 118 can be a conventional microprocessor, programmable logic device or the like, and also include interface circuitry such that the controller 214 is responsive to signals from the receiver 212 and drives the transmitter 210. Moreover, the distance signaling module 216 can comprise software or firmware executed by the controller 214. Alternatively, the signaling module 216 can be a processor, a programmable logic device or like circuitry.

Likewise, the correction module 218 can comprise software or firmware executed by the controller 214. Alternatively, the correction module 218 can be a processor, a programmable logic device or like circuitry. Also, the braking module 220 can comprise an electronic driver or other circuitry for actuating a brake or lock.

Figure 3:
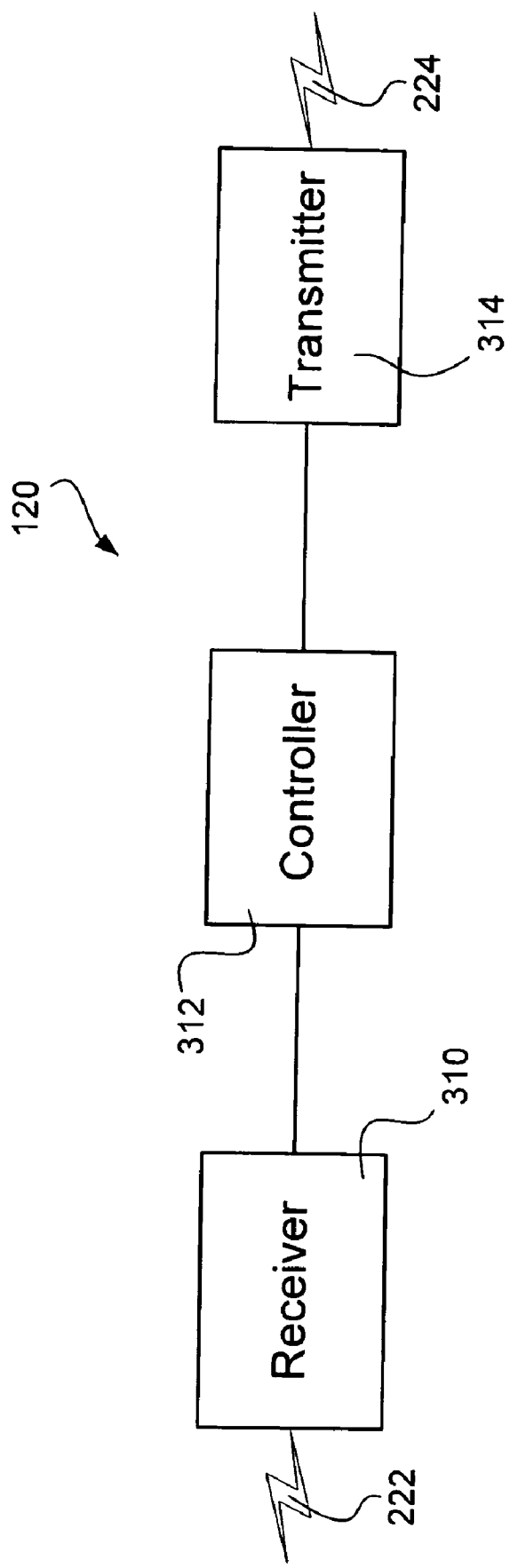
FIG. 3 is a block diagram illustrating the components of a transponder unit in accordance to one embodiment of the present invention.

Turning to FIG. 3, the transponder 120 includes a receiver 310, a controller 312 and a transmitter 314. The receiver 310 can be a conventional electromagnetic wave receiver for receiving an electromagnetic wave input 222 from another electromagnetic transmitter. The controller 312 can be a conventional microprocessor, programmable logic device or the like, and include interface circuitry such that the controller 312 is responsive to signals from the receiver 310 and drives the acoustic wave transmitter 314.

Turning back to FIG. 2, in operation, the electromagnetic wave transmitter 210 of the interrogation unit 118 periodically sends a coded signal 222 that is received by the receiver 310 of transponder unit 120 (FIG. 3). In FIG. 3, the received coded signal 222 is verified by the controller 312 whereupon the controller commands the transmitter 314 to transmit a response acoustic signal 224.

In FIG. 2, the responsive acoustic signal 224 transmitted by the transmitter 314 (FIG. 3) is received by the acoustic wave receiver 212 of interrogation unit 118. As will be appreciated by those having ordinary skill in the art, the time for the signal 224 to reach the interrogation unit 118 depends on the distance between devices 118 and 120. Preferably, the controller calculates the distance between devices 118 and 120 and provides this information to the distance signaling module 216.

In response to the calculated distance, the distance signaling module 216 can provide a visual display 226 of the calculated distance. Moreover, the distance signaling system 216 can compare the calculated distance to a predetermined distance. If the calculated distance is less than or equal to the predetermined distance, the distance signaling system 216 can provide a visual display or warning (i.e., blinking red light) and a signal to the braking module 220.

In response to the signal received from the distance signaling module 216, the braking module 220 activates the brakes to the forklift 114 to prevent a collision. Moreover, the braking module 220 can disengage the driving gear of the forklift 114, wherein these operations are optional.

Turning back to FIG. 1, as will be appreciated by those having ordinary skill in the art, if there are more than two transponders on the warehouse floor 110, then the first signal received by the interrogation unit 118 in response to its output signal 222 will be from the transponder that is closest to the interrogation unit. Accordingly, in an embodiment, the calculated distance determined and displayed by the interrogation unit 118 will be the distance between the interrogation unit 118 and the closest transponder 120.

Figure 4:
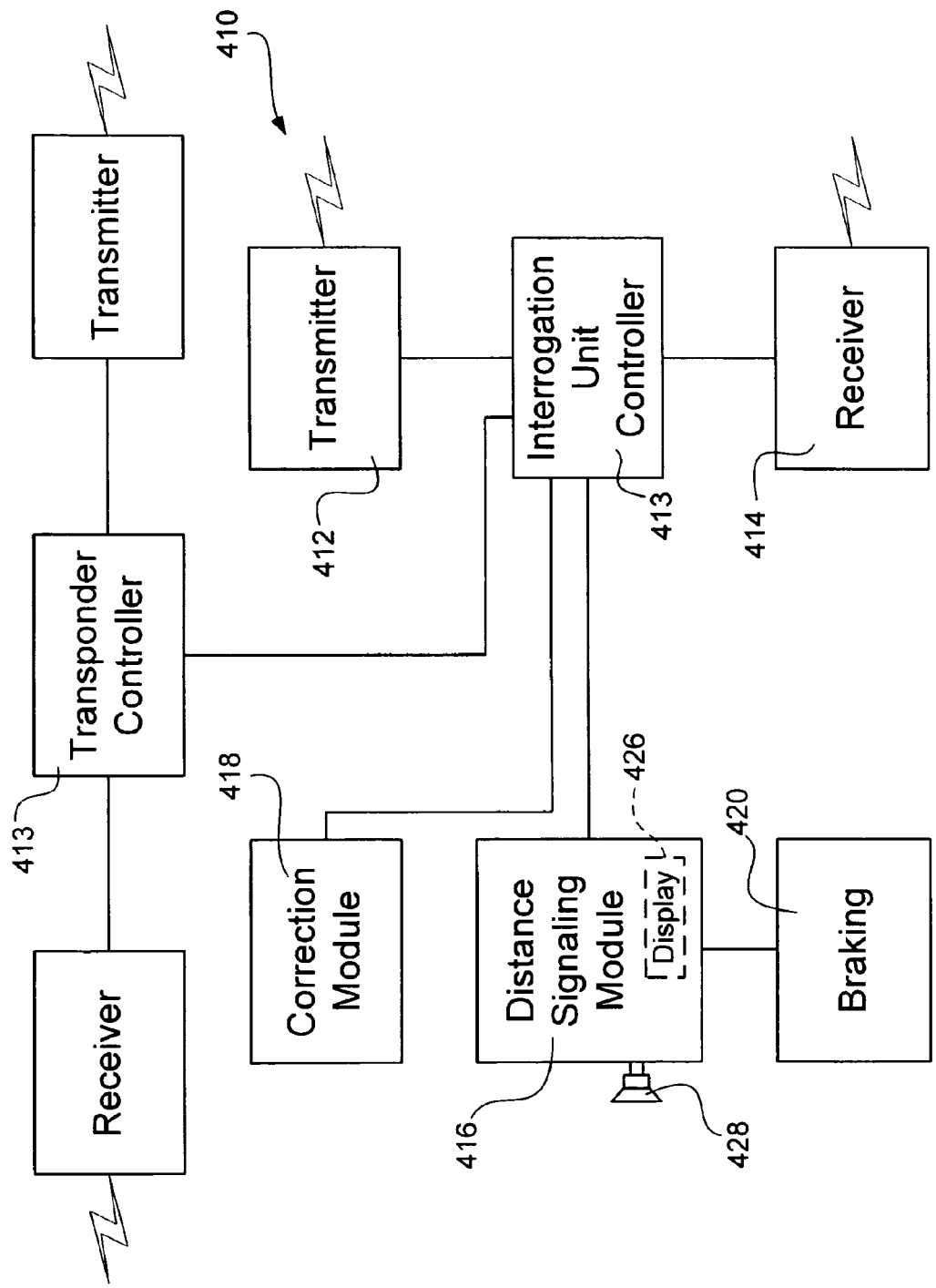
FIG. 4 is a block diagram illustrating the components of another device in accordance with another embodiment of the present invention, wherein the device has the functionality of the devices of FIG. 2 and FIG. 3; and, FIG. 5 is a simplified plan view, similar to FIG. 1, of a floor plan within a warehouse with motorized vehicles on both sides of a door.
Figure 5:
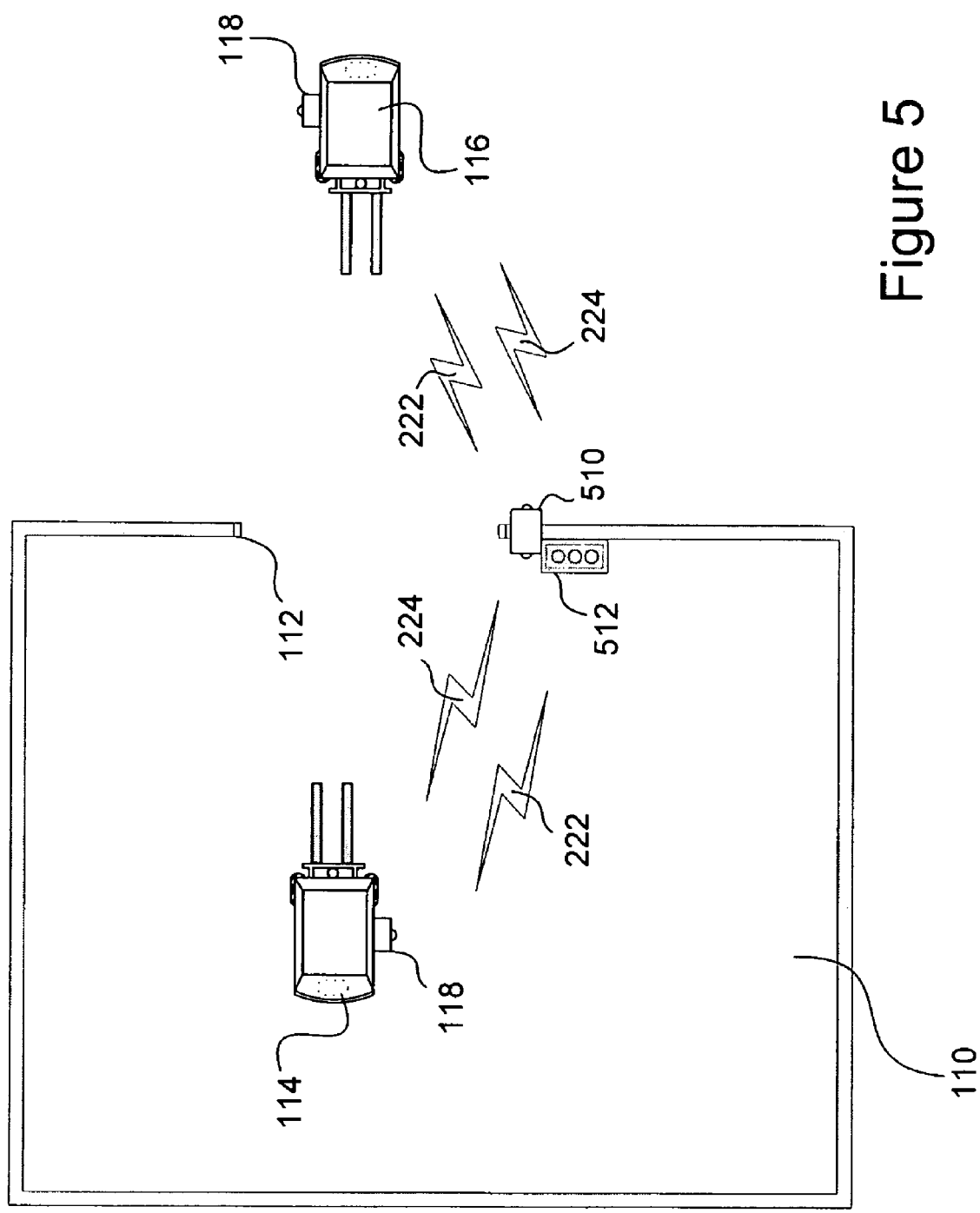

In an embodiment, the functionality of the devices of FIGS. 2 and 3 can be combined into a unit as shown in FIG. 4. In this embodiment, each object having a unit 410 will be provided with information regarding the distance between that unit and the closest other unit 410.

In this embodiment, it is desired that a correction module 418 be provided that cooperates with the controller 413 to enable the unit 410 to only initiate a distance measurement when other like units are not in the process of taking a distance measurement.

In an embodiment, the correction module 418 can monitor signal traffic to determine when an opening is available for taking a distance measurement. In an alternative embodiment, the correction system 418 can generate a unique code, based upon the monitored signal traffic. The unique code is encoded within the electromagnetic signal transmitted and returned to the unit 410, by the nearest other unit, during a distance measurement.

As indicated previously, in many companies when too many forklifts are operated at the same time, there is a collision threat especially when two of the forklifts are going towards the same door opening in different directions. Moreover, numerous companies have both equipment and foot traffic using the same door, resulting in the collision threat being substantial.

In an embodiment, the door can be equipped with a conventional device 510 (i.e., a repeater) wherein electromagnetic signals are relayed between both sides of the door. Accordingly, the distance from a device on the other side of a door, and thus unseen by the operator of a motorized vehicle, can be determined and a warning can be given if needed.

In yet another embodiment, the device 510 can be provided with the functionality of FIG. 4, but for the braking module, wherein information about the forklift approaching from the other side of the door can be signaled in many different ways such as, for example, a signal light 512 can be provided.

As such, the light 512 can provide different colors according to an approaching threat. For instance, a green light can indicate no collision threat, a yellow light can indicate a threat of 6-8 yards, a blinking red light can indicate a threat of 2-4 yards, and a constant red light can indicate a threat of 0-2 yards. Moreover, a speaker 428 or the like can be provided to generate a sound to indicate the level of threat.

In a further embodiment, signaling can be provided on both sides of the door to indicate the collision threat. Moreover, a device having some or all of the functionality of FIG. 4 can be provided in a single unit and provided to both vehicles and persons working in a warehouse. This way, persons can be warned about a collision threat with an approaching forklift not only in the area of the door, but also within the entire working space of the warehouse. Moreover, forklift operators can also receive warnings about persons in the immediate vicinity of the forklift.

As will be appreciated by those having ordinary skill in the art, the present invention enables increasing work safety in big companies, especially those with large warehouses, using motorized vehicles like forklifts for work. Additionally, the present invention will comfort employees by eliminating stress related to the possibility of an accident. Thus, reducing the amount of time spent by employees in ensuring for their personal safety in working in environments with motorized machinery. Accordingly, the work efficiency will be improved.

It should be emphasized that the above-described embodiments of the present invention, particularly, any "preferred" embodiments, are possible examples of implementations merely set forth for a clear understanding of the principles for the invention. Many variations and modifications may be made to the above-described embodiment(s) of the invention without substantially departing from the spirit and principles of the invention. All such modifications are intended to be included herein within the scope of this disclosure and the present invention, and protected by the following claims.

What is claimed is:

1. An apparatus comprising:
   a first transponder disposed on a first motorized vehicle and a second transponder disposed on a second motorized vehicle;
   an interrogation unit in communication with the transponders and being disposed about a door opening,
   wherein a distance between the first transponder and the interrogation unit is calculated by the interrogation unit and a first signal is provided by the interrogation unit to the first motorized vehicle if the distance is within a predetermined range; and,
   wherein a second signal is provided by the interrogation unit to the first transponder if a distance between the second transponder and the interrogation unit is within a predetermined range.

2. The apparatus of claim 1 wherein the motorized vehicles are forklifts.

3. The apparatus of claim 1 wherein the interrogation unit activates brakes on the motorized vehicle if the calculated distance is within a predetermined range.

4. The apparatus of claim 1 wherein the transponder and the interrogation units are in communication with each other via electromagnetic and acoustic signals.

5. The apparatus of claim 1 wherein the interrogation units includes a display to display the distance.

6. The apparatus of claim 1 wherein the signals are a lighting signal.

7. The apparatus of claim 1 wherein the interrogation unit is disposed on a first side of the door opening and further comprising a second interrogation unit is disposed on an opposite side of the door opening.

8. A method comprising the steps of:
  transmitting an electromagnetic signal from an interrogation unit;
  transmitting an acoustic signal from a first transponder in response to the signal transmitted from the interrogation unit;
  calculating a distance between the interrogation unit and the transponder in response to the signal received from the first transponder;
  providing a warning if the calculated distance is within a predetermined range; and,
  providing a warning signal from the interrogation unit to the first transponder if the distance between a second transponder and the interrogation unit is within a second predetermined range.

9. The method of claim 8 further comprising the step of activating the brakes on the motorized vehicle if the calculated distance is within the first or second predetermined range.

10. The method of claim 9 wherein the motorized vehicle is a forklift or other motorized vehicles.

11. The method of claim 8 further comprising the step of mounting the interrogation unit about an opening to a door.

12. The method of claim 8 further comprising the step of displaying the distance on a display.

13. The method of claim 8 further comprising the step of activating a lighting system as the warning signal to indicate a collision threat level based on the distance.

14. The method of claim 13 wherein the interrogation unit is disposed on a first side of a door and a second interrogation unit is disposed on a second side of the door.

15. The method of claim 14 wherein the first transponder is mounted to motorized vehicle and wherein the second transponder is mounted to a second motorized vehicle.

16. The method of claim 8 wherein the first transponder is mounted to a motorized vehicle and the second transponder is attached to a human.

* * * * *